US006607707B2

(12) United States Patent
Reichman et al.

(10) Patent No.: US 6,607,707 B2
(45) Date of Patent: Aug. 19, 2003

(54) PRODUCTION OF HYDROGEN FROM HYDROCARBONS AND OXYGENATED HYDROCARBONS

(75) Inventors: Benjamin Reichman, West Bloomfield, MI (US); William Mays, Livonia, MI (US)

(73) Assignee: Ovonic Battery Company, Inc., Troy, MI (US)

( * ) Notice: Subject to any disclaimer, the term of this patent is extended or adjusted under 35 U.S.C. 154(b) by 102 days.

(21) Appl. No.: 09/929,940

(22) Filed: Aug. 15, 2001

(65) Prior Publication Data

US 2003/0044349 A1 Mar. 6, 2003

(51) Int. Cl.$^7$ .............. C01B 3/22; C01B 3/24; C01B 3/26
(52) U.S. Cl. ............ 423/648.1; 423/650; 423/651
(58) Field of Search .............. 423/648.1, 650, 423/651, 652

(56) References Cited

U.S. PATENT DOCUMENTS 4,780,300 A * 10/1988 Yokoyama et al. ...... 423/648.1

* cited by examiner

Primary Examiner—Wayne A. Langel
(74) Attorney, Agent, or Firm—Kevin L. Bray; Marvin S. Siskind

(57) ABSTRACT

A process for producing hydrogen gas from hydrocarbon and oxygenated hydrocarbon compounds. The process includes combining a hydrocarbon or oxygenated hydrocarbon compound with a base to form a mixture that undergoes a reaction to produce hydrogen gas. The reaction mixture optionally includes water and/or a catalyst. In a preferred embodiment, hydrogen production occurs from methanol in the liquid phase without the production of environment harmful by-product gases.

27 Claims, 3 Drawing Sheets

PRODUCTION OF HYDROGEN FROM HYDROCARBONS AND OXYGENATED HYDROCARBONS

FIELD OF THE INVENTION

The invention relates to the production of hydrogen through oxidation reactions of hydrocarbon or oxygenated hydrocarbon compounds. More specifically, the invention relates to the combining of hydrocarbons and oxygenated hydrocarbons with bases to form hydrogen.

BACKGROUND OF THE INVENTION

As the supply of fossil fuels steadily dwindles and the deleterious environmental consequences of fossil fuels steadily increase, it is becoming increasingly evident that new fuels and forms of energy are needed. Significant efforts have been undertaken over the years to identify acceptable substitutes for fossil fuels. The desired attributes of a new fuel or energy source include low cost, ample supply, renewability, safety, and environmental compatibility.

The alternatives that are being explored can be divided into three broad categories: nuclear power, solar energy, and chemical fuels. In nuclear power, energy is extracted from the natural decay of radioactive elements. Although large amounts of energy are available from nuclear decay processes, the development of nuclear power has been limited because of concerns over the handling of radioactive elements and the disposal of radioactive waste. The public also worries about the possibility of runaway reactions and core meltdown during the operation of nuclear power plants.

Solar energy offers the promise of tapping the enormous energy reserves contained in the sun. The primary objective in solar energy development is the efficient collection and conversion of the energy contained in sunlight to electricity. The conversion is typically accomplished through photovoltaic devices that absorb and transform the wavelengths of light emitted by the sun. The transformation normally involves the production of electrical charge carriers via a valence band to conduction band absorption process in a semiconductor material. A desirable feature of using semiconductors to convert solar energy to electricity is the absence of pollution and the near zero maintenance requirements. Most solar energy devices are based on silicon and much research activity has been directed at optimizing the sunlight-to-electricity conversion efficiency through the development of better materials and innovative device structures. Although much progress has been made and will continue to be made in solar energy, efficiencies are currently limited to 10–15%.

Chemical fuels are a broad class of energy sources and encompass any substance capable of delivering energy through a chemical reaction. Conventional fossil fuels are included among chemical fuels and deliver energy through combustion reactions. The search for new chemical fuels is focusing on materials that combust cleanly and at less extreme conditions than gasoline and other petroleum based fuels. The objective of achieving clean burning fuels is directed at minimizing or eliminating environmentally undesirable by-products such as CO, $CO_2$ and $NO_x$ gases. If reaction conditions less extreme than the high temperatures required in standard internal combustion engines can be found, an opportunity exists for developing simpler and lighter weight engines that run more efficiently. Much of the work on synfuels in the 1970's and 1980's focused on developing alternative chemical fuels for combustion engines. Various hydrocarbons and oxygenated hydrocarbon compounds such as methanol have been considered. Although some promising results have been obtained, no alternative has proven sufficiently successful to motivate the costly transition from the current fuels to a new fuel source.

Hydrogen is currently the best prospect for replacing or reducing our dependence on conventional fossil fuels. The strong interest in hydrogen is a consequence of its clean burning properties and abundance. When reacted with oxygen, hydrogen produces only water as a by-product. Hence, hydrogen is an environmentally friendly fuel. Hydrogen is also the most abundant element in the universe and is contained in large amounts in many chemical compounds. Hydrogen therefore is an attractive alternative fuel source.

The realization of hydrogen as an ubiquitous source of energy ultimately depends on its economic feasibility. Economically viable methods for extracting and/or recovering hydrogen from chemical feedstocks, as well as efficient means for storing, transferring, and consuming hydrogen, are needed. The most readily available chemical feedstocks for hydrogen are organic compounds, primarily hydrocarbons and oxygenated hydrocarbons. The most common methods for obtaining hydrogen from hydrocarbons and oxygenated hydrocarbons are dehydrogenation reactions and oxidation reactions. Dehydrogenation reactions produce hydrogen by transforming saturated hydrocarbons to unsaturated hydrocarbons. Reformation reactions are a common type of oxidation reaction and involve the breaking of bonds between hydrogen and other atoms such as carbon, oxygen or nitrogen. Hydrogen atoms released upon bond breakage combine to form the desired diatomic hydrogen molecules. The broken bonds remaining on the feedstock molecules recombine or reform to produce new molecules. The reformation process is formally an oxidation reaction of the feedstock molecules.

Production of hydrogen from hydrocarbon and oxygenated hydrocarbon compounds is frequently accomplished with a steam reformation process. In steam reformation processes, a hydrocarbon or oxygenated hydrocarbon (e.g. methanol) feedstock is contacted with water in a high temperature reactor to produce hydrogen gas ($H_2$) along with carbon monoxide (CO) and/or carbon dioxide ($CO_2$). Representative hydrogen producing steam reformation reactions for a general hydrocarbon ($C_nH_m$) and a general alcohol ($C_pH_qOH$), are given below:

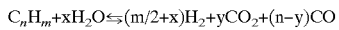

$C_nH_m + xH_2O \leftrightarrows (m/2+x)H_2 + yCO_2 + (n-y)CO$

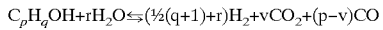

$C_pH_qOH + rH_2O \leftrightarrows (\frac{1}{2}(q+1)+r)H_2 + vCO_2 + (p-v)CO$

The hydrocarbon $C_nH_m$ can be an alkane, alkene or alkyne and the group $C_pH_q$ on the general alcohol can be an alkyl, alkenyl, or alkynyl group. Similar reactions can be used to describe the production of hydrogen from other oxygenated hydrocarbons such as aldehydes, ketones, and ethers. The relative amounts of $CO_2$ and CO produced depend on the specific reactant molecule, the amount of water used, and the reaction conditions (e.g. temperature and pressure).

Although the prior art steam reformation processes effectively generate hydrogen, they suffer from several drawbacks. First, the reactions are endothermic at room temperature and therefore require heating. Temperatures of several hundred degrees are needed to realize acceptable reaction rates. These temperatures are costly to provide, impose special requirements on the materials used to construct the reactors, and limit the range of applications. Second, the required high temperatures imply that steam reformation reactions occur in the gas phase. This means that hydrogen must be recovered from a mixture of gases through some means of separation. The separation means adds cost and complexity to the reformation process and make it difficult to obtain perfectly pure hydrogen. Finally, the production of $CO_2$ and/or CO is environmentally undesirable since both gases contribute to the greenhouse effect believed to be responsible for global warming.

It is evident that a need exists for producing hydrogen from organic chemical feedstocks in an efficient, economically feasible, and environmentally friendly way. It would be desirable to have a process for producing hydrogen that is effective closer to room temperature than the current commonly used processes and that avoids or minimizes the production of environmentally harmful gases as by-products. Discovery of an acceptable process for producing hydrogen would greatly advance the cause of achieving a clean-burning economy based on hydrogen. Convenient access to hydrogen fuel, coupled to efficient technologies such as fuel cells for extracting energy from hydrogen, offers the potential to greatly reduce our current dependence on fossil fuels.

SUMMARY OF THE INVENTION

There is disclosed herein a process for producing hydrogen gas from hydrocarbon or oxygenated hydrocarbon compounds. The process comprises the step of combining a hydrocarbon or oxygenated hydrocarbon with a base, optionally in the presence of water and/or a catalyst. The process effects a reaction of hydrocarbon and oxygenated hydrocarbon compounds to produce hydrogen gas. Inclusion of a base introduces hydroxide ions into the reaction mixture. The hydroxide ions initiate reactions of hydrocarbon or oxygenated hydroxide compounds that proceed substantially through the formation of the bicarbonate ion and/or carbonate ion instead of substantially through the formation of the environmentally undesirable gases carbon monoxide and/or carbon dioxide as occurs in the conventional hydrogen production through steam reformation processes. The hydroxide initiated reactions of the present invention permit reaction in the liquid phase and avoid the high temperature or steam conditions typical of prior art hydrogen production processes. Furthermore, in the hydroxide initiated reactions of the present invention, hydrogen is the only gas phase product produced. Consequently, the hydrogen gas produced in present invention is easily recovered and deliverable to hydrogen-based energy or storage devices such as fuel cells or hydrogen storage alloys.

A wide variety of hudrocarbon and oxygenated hydrocarbon compounds are suitable for the present invention including but not limited to alkanes, alkenes, alkynes, alcohols, and aldehydes. Suitable bases include compounds that produce or lead to the production of hydroxide ions in the reaction mixture. Metal hydroxides are the preferred bases. Various catalysts are effective in accelerating the reformation reaction of the present invention. These include, but are not limited to, transition metals, noble metals, metal oxides, and metal hydrides, either supported or unsupported. In a particularly preferred embodiment of the present invention, hydrogen gas is produced from the reaction of methanol with an aqueous potassium hydroxide solution in the presence of a catalyst comprised of platinum supported on carbon.

DETAILED DESCRIPTION OF THE INVENTION

Figure 1:
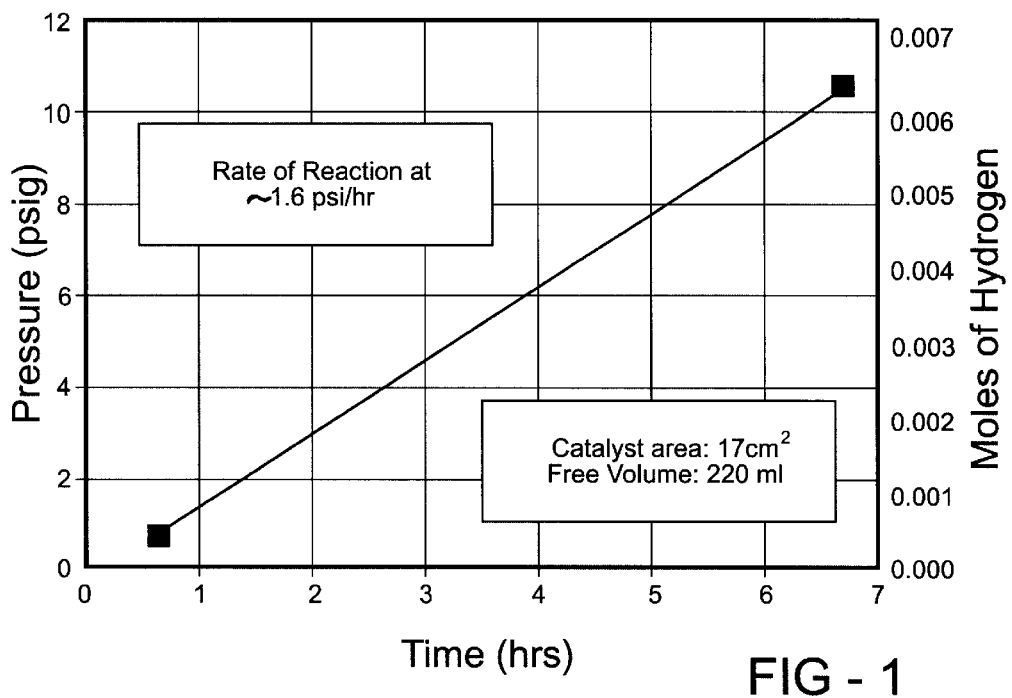
FIG. 1 is a plot of the pressure and moles of hydrogen gas produced as a function of time in the reaction of a mixture comprising 40 mL of methanol and a solution containing 20 mL of water and 40 g of KOH in the presence of a Pt/C catalyst at 118° C.

The present invention provides a method for efficiently reacting hydrocarbon and oxygenated hydrocarbon compounds to form hydrogen gas ($H_2$). The term "hydrocarbon" as defined herein refers to chemical compounds comprising carbon and hydrogen and includes alkanes, alkenes, alkynes and substituted forms thereof. The term "oxygenated hydrocarbon" as defined herein refers to chemical compounds comprising carbon, hydrogen, and oxygen and includes alcohols, aldehydes, ketones, ethers, carboxylic acids and substituted forms thereof.

The method of the present invention comprises combining a hydrocarbon compound or oxygenated hydrocarbon compound with a base. The presence of the base increases the pH of the mixture. At sufficiently high pH values, a reaction occurs between the hydrocarbon compound or oxygenated hydrocarbon compound and hydroxide ions ($OH^-$) from the base to produce hydrogen gas. The present invention allows for the production of hydrogen gas at lower temperatures from a hydrocarbon or oxygenated hydrocarbon compound than is possible with conventional steam reformation processes and does so without producing environmentally harmful gases as by-products. The base may be in the form of an aqueous solution.

The present inventors have considered predictive factors relevant to the expedient formation of hydrogen gas from a chemical reaction. The Gibbs free energy of a reaction ($\Delta G_{rxn}$) is a thermodynamic indicator of whether a reaction occurs at a given temperature. In order for a reaction to be spontaneous at a given temperature, it must have a negative value of the Gibbs free energy at that temperature. Reactions with a positive Gibbs free energy do not occur spontaneously, but rather can occur only with the addition of energy from an external source. Any reaction used to produce hydrogen at a desired temperature, therefore, should possess a negative Gibbs free energy at that temperature.

Preferably, the Gibbs free energy of reaction should be negative at a temperature near room temperature.

Table 1 lists the Gibbs free energy of several hydrogen producing reactions at 25° C., 1 atm. and unit activity of the reactants and products. The reactions listed in Table 1 are representative of the hydrocarbon and oxygenated hydrocarbon compounds that can be used in the present invention. Table 1 includes conventional reformation reactions with water as well as alternative reactions that occur in the presence of a base. The scope of the present invention is not limited to the representative examples given in Table 1. Also, the values of the Gibbs free

TABLE 1

Gibbs Free Energy of Reaction ($\Delta G_{rxn}$) for Reformation Reactions of Several Hydrocarbons and Oxygenated Hydrocarbons at 25° C., 1 atm. and unit activity of reactants and products.

| Reaction | $\Delta G_{rxn}$ (calories) |
|---|---|
| Hydrocarbons Methane | |
| $CH_4 + 2H_2O \leftrightarrows 4H_2 + CO_2$ | 31,260 |
| $CH_4 + 2OH^- \leftrightarrows 4H_2 + CO_3^{2-}$ | 17,800 |
| Oxygenated Hydrocarbons Methanol | |
| $CH_3OH + H_2O \leftrightarrows 3H_2 + CO_2$ | 4,130 |
| $CH_3OH + OH^- + H_2O \leftrightarrows 3H_2 + HCO_3^-$ | −4,325 |
| $CH_3OH + 2OH^- \leftrightarrows 3H_2 + CO_3^{2-}$ | −9,330 |
| Ethanol | |
| $C_2H_5OH + 3H_2O \leftrightarrows 6H_2 + 2CO_2$ | 23,950 |
| $C_2H_5OH + 2OH^- + 3H_2O \leftrightarrows 6H_2 + 2HCO_3^-$ | 7,040 |
| $C_2H_5OH + 4OH^- + H_2O \leftrightarrows 6H_2 + 2CO_3^{2-}$ | −2,970 |
| Formaldehyde | |
| $HC(O)H + H_2O \leftrightarrows 2H_2 + CO_2$ | −6,570 |
| $HC(O)H + OH^- + H_2O \leftrightarrows 2H_2 + HCO_3^-$ | −15,025 |
| $HC(O)H + 2OH^- \leftrightarrows 2H_2 + CO_3^{2-}$ | −20,030 |
| Formic Acid | |
| $HC(O)OH \leftrightarrows H_2 + CO_2$ | −9,160 |
| $HC(O)OH + 2OH^- \leftrightarrows H_2 + CO_3^{2-} + H_2O$ | −22,620 | energy of reaction listed in Table 1 correspond to the particular set of indicated conditions (i.e. 25° C., 1 atm, and unit activity of reactants and products). In practice, variations in conditions such as temperature, pressure, and concentration will influence the Gibbs free energy of reaction in a way that is known from thermodynamics and will lead to numerical values that differ from those included in Table 1. The principles of the invention herein described nonetheless extend analogously to conditions different from those contained in Table 1.

By way of example, the conventional reformation reaction of methanol ($CH_3OH$) with water is given below:

$$CH_3OH + H_2O \leftrightarrows 3H_2 + CO_2 \quad (1)$$

A thermodynamic analysis of this reaction indicates that it has a positive Gibbs free energy at the conditions indicated in Table 1. The production of hydrogen from methanol and water is therefore unfavored and does not occur at the conditions indicated in Table 1. Only at temperatures substantially above 25° C. does the Gibbs free energy of the reformation reaction of methanol with water become negative. Thermodynamic calculations, which have been verified experimentally, indicate that temperatures of several hundred degrees are needed for the production of hydrogen through the reformation reaction of methanol with water to occur. At these temperatures, water exists as a gas and the reaction is referred to as the steam reformation reaction of methanol. Reactions to produce hydrogen through the reformation of most common hydrocarbons and oxygenated hydrocarbons with water have a positive Gibbs free energy near room temperature and necessarily require high temperatures and steam conditions to occur.

The present inventors have discovered that the production of hydrogen from hydrocarbon and oxygenated hydrocarbon compounds can be made to occur by a different reaction process when a base is present. The addition of a base to a mixture of a hydrocarbon or oxygenated hydrocarbon compound with water increases the pH of the mixture. The present inventors have recognized from thermodynamics that the Gibbs free energy of the reaction of many hydrocarbon and oxygenated hydrocarbon compounds with water to produce hydrogen decreases because the nature of the reaction process changes as the pH of the reaction mixture increases. By virtue of this recognition, the present inventors have realized that hydrogen production reactions are facilitated when a base is included in mixtures of hydrocarbons or oxygenated hydrocarbons with water. The present inventors have also recognized that hydrogen can be produced by adding a base in the form of a partially soluble solid or in the form of an aqueous solution to a liquid phase hydrocarbon or oxygenated hydrocarbon compound.

The different reaction processes are illustrated below using methanol as a representative oxygenated hydrocarbon:

$$CH_3OH + H_2O \leftrightarrows 3H_2 + CO_2 \quad (1)$$

$$CH_3OH + OH^- + H_2O \leftrightarrows 3H_2 + HCO_3^- \quad (2)$$

$$CH_3OH + 2OH^- \leftrightarrows 3H_2 + CO_3^{2-} \quad (3)$$

Reaction (1) is the reaction of methanol with water only and reactions (2) and (3) are reactions of methanol in the presence of a base. The principle difference in the reaction mixture when a base is added is the presence of the hydroxide ion ($OH^-$). The hydroxide ion introduces a process for producing hydrogen gas from methanol through the formation of the bicarbonate ion ($HCO_3^-$) or the carbonate ion ($CO_3^{2-}$). A thermodynamic analysis of reactions (2) and (3) indicates, in contrast to reaction (1), that each of the two reactions has a negative Gibbs free energy at the conditions indicated in Table 1. Consequently, according to thermodynamics, reactions (2) and (3) are expected to occur near room temperature, whereas reaction (1) is not. This conclusion holds at all conditions for which the Gibbs free energy of reaction (1) is positive, while the Gibbs free energy of reactions (2) and (3) are negative. At conditions for which the Gibbs free energy of each of the three reactions is negative, kinetics rather than thermodynamics become the controlling factor in assessing which reaction occurs most favorably.

Since reactions (2) and (3) both have a negative Gibbs free energy at and above room temperature, reaction kinetics determine the relative importance of reactions (2) and (3) in a reaction mixture comprising methanol and a base. The amount of base present in the reaction mixture is the primary consideration. When small amounts of base are present, reaction (2) is favored over reaction (3). As the amount of base increases, however, reaction (3) becomes increasingly important and eventually becomes controlling in a manner that is well described by standard theories of chemical reactions. The concentration of hydroxide ion is the critical factor that dictates whether reaction (2) or (3) is controlling. Consequently, the initial pH of the reaction mixture provides an indication of whether reaction (2) or reaction (3) is controlling. Thermodynamic data shows that reaction (2) is controlling when the pH of the initial reaction mixture is between about 6.4 and 10.3 and that reaction (3) is controlling when the pH of the initial reaction mixture is above about 10.3. When the pH of the initial reaction mixture is below about 6.4, reaction (1) is controlling.

The present inventors have further reasoned that the production of hydrogen gas occurs at lower temperatures from a hydrocarbon or oxygenated hydrocarbon compounds when a base is present as a consequence of the ability of a base to lower the Gibbs free energy by changing the nature of the reaction. Hydrogen production from a mixture of a hydrocarbon or oxygenated hydrocarbon compound with water occurring through a reaction with a positive Gibbs free energy at a given set of conditions occurs with a smaller positive or even a negative Gibbs free energy through a different reaction in the presence of a base at the same conditions. Hydrogen production reactions with a negative Gibbs free energy exhibit an even more negative Gibbs free energy in the presence of a base. Consequently, addition of a base to a hydrocarbon or oxygenated hydrocarbon compound promotes the production of hydrogen gas from hydrocarbons and oxygenated hydrocarbons at a given set of conditions.

Similarly, for a given hydrogen production reaction of hydrocarbon or oxygenated hydrocarbon compound with water (with or without a basic substance), an increase in temperature normally promotes the production of hydrogen by lowering the Gibbs free energy of the reaction. A reaction with a positive Gibbs free energy at a given temperature normally exhibits a smaller positive and ultimately a negative Gibbs free energy as the temperature is increased. When the Gibbs free energy becomes negative, the reaction becomes thermodynamically feasible. Since a base lowers the Gibbs free energy independent of temperature, inclusion of a base in a hydrogen producing reaction mixture of a hydrocarbon or oxygenated hydrocarbon lowers the temperature at which the Gibbs free energy becomes negative.

The hydrogen producing reformation reactions of many hydrocarbon compounds in water in the absence of a basic substance have a positive Gibbs free energy. Methane ($CH_4$), for example, has a large positive Gibbs free energy associated with its reformation reaction in water at the conditions of Table 1. The Gibbs free energy of the hydrogen producing reaction of methane remains positive in the presence of a base at the conditions of Table 1. Since the value of the Gibbs free energy of the hydrogen producing reaction process in the presence of a base at the conditions of Table 1 is smaller, however, the temperature at which hydrogen production from methane becomes thermodynamically feasible is lower in the presence of a base. In this sense, the presence of a base facilitates the production of hydrogen from methane. Consequently, hydrocarbon compounds such as methane are included in the scope of the present invention even though their hydrogen production reactions in the presence of a base do not occur spontaneously at room temperature.

The present inventors have completed several experiments to demonstrate the ability of a base to enhance the production of hydrogen from hydrocarbon and oxygenated hydrocarbon compounds. In a typical experimental configuration, a three neck reaction flask was used to contain the reaction mixture. A hydrocarbon or oxygenated hydrocarbon compound was first introduced into the flask. In some experiments, only water was also added to the flask containing the hydrocarbon or oxygenated hydrocarbon compound. In other experiments, a base was added to the water before adding the water to the hydrocarbon or oxygenated hydrocarbon compound in the reaction flask. In still other experiments, the base was added directly to the hydrocarbon or oxygenated hydrocarbon compound in the reaction flask without water. Some experiments also included a catalyst in an attempt to increase the rate of reaction. In all experimental scenarios, the contents of the reaction flask were flushed with an inert gas such as helium. The contents of the reaction flask were then allowed to react and any gas produced was collected and analyzed to determine its chemical components. Experiments were completed at different temperatures. Specific experiments are described hereinbelow.

EXPERIMENT 1

In this experiment, methanol and water were mixed in the reaction flask without inclusion of a base or a catalyst. Specifically, 40 mL of methanol and 40 mL of water were placed in the reaction flask. The mixture formed a homogeneous solution in the reaction flask. No evolution of gas was observed from the mixture of methanol and water at room temperature or upon heating up to the boiling point of the mixture. The absence of gas evolution indicates that the reformation of methanol does not occur and that hydrogen gas is not produced from the mixture up to its boiling point. As discussed in the prior art, temperatures well above the boiling point are required to observe appreciable hydrogen formation from a mixture of methanol and water.

EXPERIMENT 2

In this experiment, methanol and water were mixed in the reaction flask in the presence of a catalyst without inclusion of a base. Specifically, 40 mL of methanol, 40 mL of water, and a catalyst were placed in the reaction flask. A Pt/C catalyst (platinum supported on high surface area activated carbon) was selected for the experiment. The catalyst was in the form of a thin rectangular solid sheet with approximate dimensions of 3 cm×6 cm. No evolution of gas was observed from the mixture of methanol and water in the presence of the catalyst at room temperature or upon heating up to the boiling point of the mixture. The absence of gas evolution indicates that methanol reformation does not occur and that hydrogen gas is not produced from the mixture in the presence of a Pt/C catalyst up to the boiling point of the reaction mixture.

EXPERIMENT 3

In this experiment, methanol, water, and a base (KOH) were mixed in a reaction flask in the presence of a catalyst. Specifically, 40 mL of methanol was mixed with a solution containing 20 mL of water and 40 g of KOH in the reaction flask in the presence of a catalyst. A Pt/C (platinum supported on high surface area activated carbon) catalyst was selected for this experiment. The catalyst was in the form of a thin rectangular solid sheet with approximate dimensions of 2 cm×4.25 cm. Several reaction temperatures below the boiling point of the reaction mixture were considered. At reaction temperatures above about 65° C., a gas was observed to evolve from the surface of the catalyst. The gas was collected, analyzed by gas chromatography, and determined to be hydrogen gas ($H_2$). The presence of $H_2$ gas indicates that hydrogen production from a mixture of methanol and water occurs at a measurable rate in the presence of KOH base and a Pt/C catalyst above about 65° C.

A quantitative determination of the amount of $H_2$ gas produced by the reaction was completed at a reaction temperature of 118° C. The production of $H_2$ gas is manifested as an increase in the pressure of the reaction flask. The variation of the pressure in the reaction flask with time, therefore, can be used as a measure of the amount of $H_2$ gas produced by the reaction over time. In order to accurately measure the amount of $H_2$ gas produced, the reaction flask was shielded from the atmosphere to prevent exposure to air and to prevent leakage of $H_2$ gas. By following this procedure, the pressure increase in the flask is directly proportional to the amount of $H_2$ gas formed in the reaction. The pressure increase, for example, can be directly converted to the number of moles of $H_2$ gas produced by the reaction. The slope of a plot of the hydrogen pressure (or moles of hydrogen formed) in the reaction flask as a function of time provides a measure of the rate of production of hydrogen gas.

The amount of $H_2$ gas produced by the reaction at various intervals over a period of time exceeding 10 hours was measured for the reaction mixture formed from 40 mL of methanol and a solution containing 20 mL of water and 40 g of KOH in the presence of a Pt/C catalyst at 118° C. The total pressure of the gases in the reaction flask was measured with a pressure transducer attached to the reaction flask. The reaction mixture was heated up to 118° C. for a fixed time interval to induce reaction and cooled to room temperature to arrest the reaction. In this way, the progress of the reaction as a function of time was conveniently assessed. The total pressure was measured continuously as the temperature of the reaction mixture was cycled between room temperature and 118° C. The hydrogen pressure was obtained by subtracting a baseline pressure due to helium, residual air and vapors from methanol and water from the total pressure. The procedure is now described more fully. The methanol and solution containing water and KOH were added at room temperature to a reaction flask. The Pt/C catalyst was next introduced into the flask. The reaction flask was sealed to the atmosphere and then flushed with helium. A gas chromatograph measurement was made to obtain the baseline of the gases in the reaction flask before heating. The reaction flask was then heated to 118° C. The reaction was allowed to proceed for a predetermined time interval at 118° C. The total pressure in the flask was measured continuously during the reaction. Upon expiration of the time interval, the total pressure was noted and the reaction mixture was cooled to room temperature to arrest the progress of the reaction. The $H_2$ gas pressure was then determined by subtracting the baseline pressure from the total pressure. The $H_2$ gas pressure at room temperature is obtained by subtracting the room temperature baseline pressure measured prior to the reaction. The resulting room temperature $H_2$ gas pressure can be adjusted using known gas laws to obtain the $H_2$ gas pressure at the reaction temperature. Alternatively, the baseline pressure can be measured at the temperature of reaction and subtracted from the total pressure at the temperature of the reaction to determine the $H_2$ pressure at the temperature of the reaction. After the $H_2$ gas pressure was determined, the reaction flask was once again heated to 118° C. to continue the reaction for another predetermined interval of time. Repeated cycling of the reaction in this manner permitted the inventors to measure the hydrogen gas pressure as a function of the cumulative time of reaction. The hydrogen gas pressure can subsequently be converted to moles of hydrogen gas produced by the reaction as a function of the time of reaction. A gas chromatograph measurement was then made to insure that the pressure increase was due to hydrogen gas.

FIG. 1 presented herein shows a plot of hydrogen gas pressure as a function of time for the reaction mixture and catalyst of this experiment at 118° C., a temperature at which the reaction mixture is in the liquid phase. The corresponding moles of hydrogen gas produced are also indicated. The plot indicates that hydrogen gas is produced at a rate of 1.6 psi/hr (0.0009 mol/hr) in this experiment. This experiment shows that hydrogen gas can be produced in the liquid phase from a mixture of methanol and water in the presence of a base and a catalyst.

EXPERIMENT 4

In this experiment, methanol, water, and a base (KOH) were mixed in a reaction flask in the presence of a catalyst. Specifically, 40 mL of methanol and a solution containing 20 mL of water and 40 g of KOH were combined in the reaction flask in the presence of a catalyst. A high activity Pt/C (platinum supported on high surface area activated carbon) catalyst was selected for this experiment. The catalyst was in the form of a thin rectangular solid sheet with approximate dimensions of 3 cm×6 cm. The activity of the Pt/C catalyst of this experiment is higher than that of the Pt/C catalyst used in EXPERIMENT 3 described hereinabove. The catalyst of this experiment shall hereinafter be referred to as the high activity Pt/C catalyst. Several reaction temperatures below the boiling point of the reaction mixture were considered. Reaction of methanol and evolution of $H_2$ gas were observed in the liquid phase under the conditions of this experiment. The chemical determination and procedure for the quantification of the amount of $H_2$ gas produced by the reaction in the presence of the high activity Pt/C catalyst were completed as described in EXPERIMENT 3 hereinabove.

Figure 2:
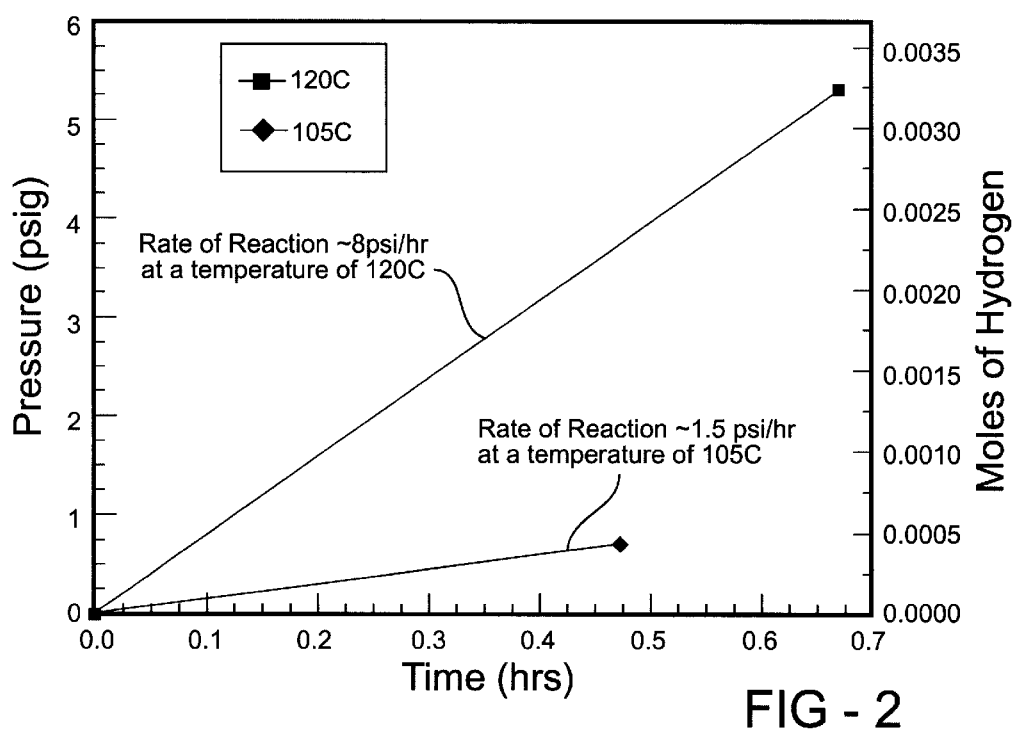
FIG. 2 is a plot of the pressure and moles of hydrogen gas produced as a function of time in the reaction of a mixture comprising 40 mL of methanol and a solution containing 20 mL of water and 40 g of KOH in the presence of a high activity Pt/C catalyst at 105° C. and 120° C.

FIG. 2 presented herein shows a plot of the rate of hydrogen gas production for the reaction mixture and catalyst of this experiment. The plot shows results for reaction temperatures of 105° C. and 120° C., temperatures at which the reaction mixture is in the liquid phase. The plot indicates that a substantial increase in the rate of $H_2$ gas production occurs with increasing reaction temperature. With the conditions of this experiment, an increase in the rate of $H_2$ gas production from 1.5 psi/hr at 105° C. to 8 psi/hr at 120° C. was observed. A commensurate increase in the reaction rate of methanol is responsible for the increased rate of $H_2$ gas production.

The results of this experiment indicate that the choice of catalyst has an influence on the rates of methanol reaction and $H_2$ gas production. A comparison of FIGS. 1 and 2 presented herein indicates that use of the high activity Pt/C catalyst leads to a substantial increase in rate of $H_2$ gas production relative to the Pt/C catalyst of EXPERIMENT 3 described hereinabove. The 8 psi/hr rate of $H_2$ gas production observed at 120° C. when using the high activity Pt/C catalyst of this experiment is a factor of five greater than the 1.6 psi/hr rate of $H_2$ gas production observed at the similar temperature of 118° C. when using the Pt/C catalyst of EXPERIMENT 3.

The results of this experiment also indicate that the choice of catalyst can be used to achieve a given rate of methanol reformation and $H_2$ gas production at different reaction temperatures. A comparison of FIGS. 1 and 2 presented herein indicates that the temperature required to achieve an $H_2$ gas production rates of approximately 1.5 psi/hr can be reduced from 118° C. to 105° C. by switching from the Pt/C catalyst of EXPERIMENT 3 described hereinabove to the higher activity Pt/C catalyst of this experiment.

EXPERIMENT 5

In this experiment, methanol, water, and a base (KOH) were mixed in a reaction flask in the presence of a catalyst.

40 mL of methanol and a solution containing 20 mL of water and 40 g of KOH were combined in the reaction flask in the presence of the high activity Pt/C catalyst as described in EXPERIMENT 4 hereinabove. The purpose of this experiment was to measure and compare the amount of hydrogen gas produced with the amount of carbonate ion in the solution contained in the reaction flask after allowing the reaction to occur for an extended period of time. Specifically, the reaction mixture was heated to 115–120° C. and allowed to react for 10 hours. After 10 hours, the reaction mixture was cooled to room temperature. The amounts of hydrogen gas produced and carbonate ion formed by the reaction were measured. The amount of hydrogen produced was measured using a pressure transducer as described in EXPERIMENT 3 hereinabove. The amount of carbonate ion formed by the reaction was measured using an acid titration method. The method involved acid titration of the solution remaining in the reaction flask through two endpoints to quantitatively convert any carbonate ion in the solution to carbonic acid ($H_2CO_3$). The amount of acid used in the titration is directly related to the amount of carbonate ion in the solution.

Under the conditions of this experiment, the inventors determined that 0.012 moles of hydrogen gas and 0.004 moles of carbonate ion were produced in the reaction. The 3:1 molar ratio of hydrogen gas to carbonate ion indicates that the reaction process is controlled by reaction (3) presented hereinabove, as expected for an initial reaction mixture that contains a large amount of base.

EXPERIMENT 6

In this experiment, methanol, water, and a base (KOH) were mixed in a reaction flask in the presence of a catalyst. Specifically, 40 mL of methanol and a solution containing 20 mL of water and 40 g of KOH were combined in the reaction flask in the presence of a catalyst. A metal hydride catalyst was used in this experiment. The metal hydride catalyst selected was an alloy comprised of zirconium, titanium, vanadium, chromium, manganese, cobalt, tin, aluminum, and nickel ($Zr_{16}Ti_9V_5Cr_{3.5}Mn_{15.6}Co_{1.5}Sn_{0.4}Al_{0.4}Ni_{38}$). Several reaction temperatures below the boiling point of the reaction mixture were considered. Reaction of methanol and evolution of $H_2$ gas were observed in the liquid phase under the conditions of this experiment. The chemical determination and procedure for the quantification of the amount of $H_2$ gas produced by the reaction in the presence of the metal hydride were completed as described in EXPERIMENT 3 hereinabove.

Figure 3:
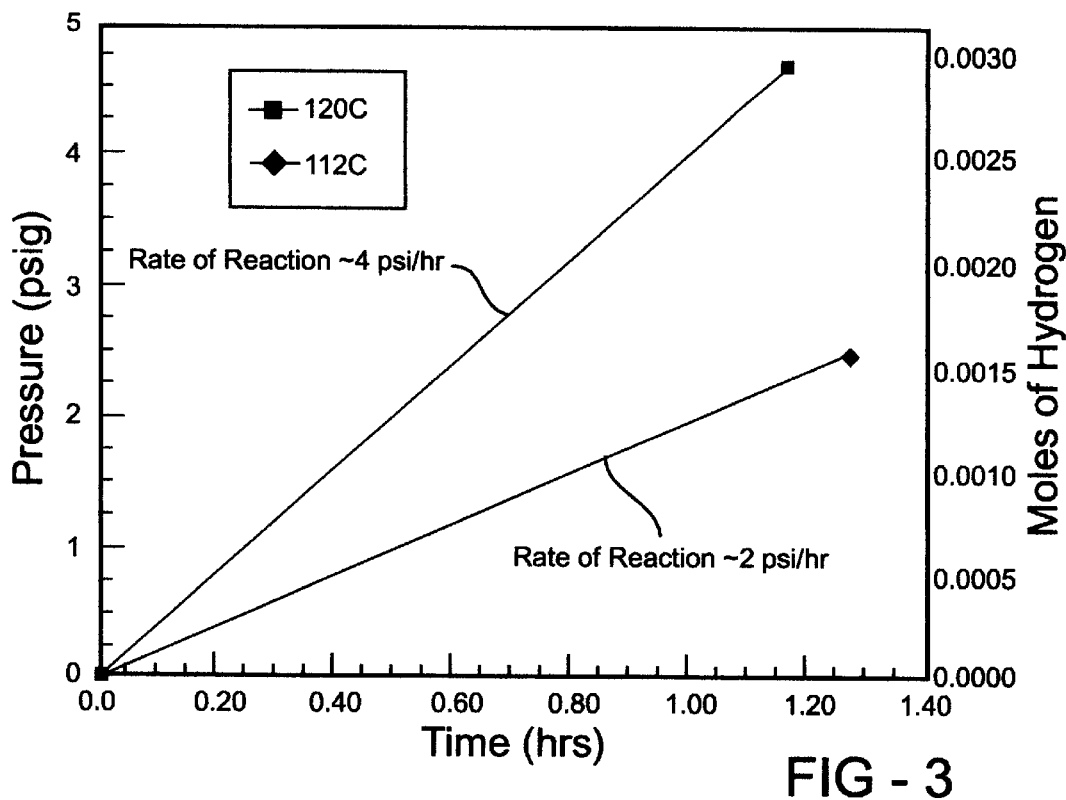
FIG. 3 is a plot of the pressure and moles of hydrogen gas produced as a function of time in the reaction of a mixture comprising 40 mL of methanol and a solution containing 20 mL of water and 40 g of KOH in the presence of a metal hydride catalyst at 112° C. and 120° C.

FIG. 3 presented herein shows a plot of the rate of hydrogen production for the reaction mixture and catalyst of this experiment. The plot shows results for reaction temperatures of 112° C. and 120° C. The plot indicates that the rate of methanol reformation and $H_2$ gas production increase with increasing reaction temperature. With the conditions of this experiment, an increase in the rate of $H_2$ gas production from 2 psi/hr at 112° C. to 4 psi/hr at 120° C. was observed. A commensurate increase in the reaction rate of methanol is responsible for the increased rate of $H_2$ gas production.

The results of this experiment further indicate that the choice of catalyst has an influence on the rates of methanol reaction and $H_2$ gas production as well as the reaction temperature required to achieve a given rate of $H_2$ gas production. In addition to the Pt/C catalysts used in EXPERIMENTS 3 and 4 described hereinabove, this experiment shows that metal hydride catalysts are also effective in promoting the production of hydrogen from methanol reformation reaction. A comparison of FIGS. 1, 2, and 3 presented herein indicates that use of the metal hydride catalyst of this experiment leads to a rate of $H_2$ gas production that is intermediate between the rates observed when using the Pt/C catalysts of EXPERIMENTS 3 and 4 described hereinabove.

EXPERIMENT 7

In this experiment, ethanol, water, and a base (KOH) were mixed in a reaction flask in the presence of a catalyst. Specifically, 40 mL of ethanol and a solution containing 20 mL of water and 20 g of KOH were combined in the reaction flask in the presence of the high activity Pt/C catalyst as described in EXPERIMENT 4 hereinabove. Several reaction temperatures below the boiling point of the reaction mixture were considered. Reaction of ethanol and evolution of $H_2$ gas from a liquid phase reaction mixture were observed under the conditions of this experiment. The chemical determination and procedure for the quantification of the amount of $H_2$ gas produced by the reaction in the presence of the high activity Pt/C catalyst were completed as described in EXPERIMENT 3 hereinabove. Evolution of $H_2$ gas was visually observable in this experiment at temperatures above about 35° C.

Figure 4:
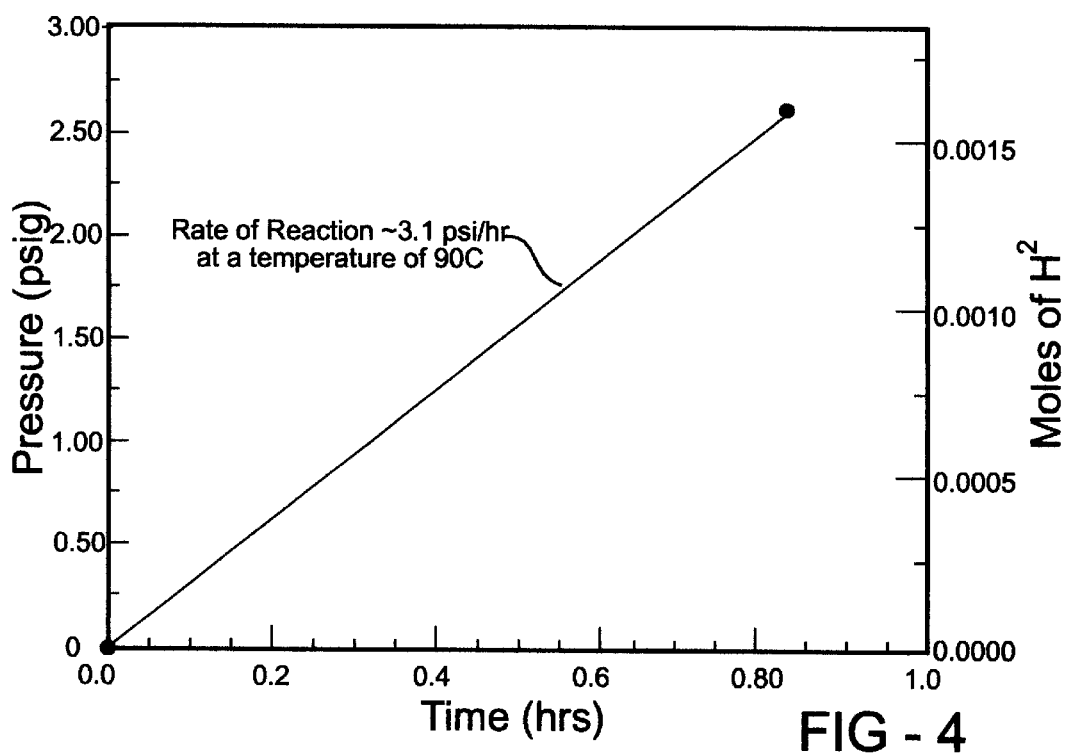
FIG. 4 is a plot of the pressure and moles of hydrogen gas produced as a function of time in the reaction of a mixture comprising 40 mL of ethanol and a solution containing 20 mL of water and 20 g of KOH in the presence of a high activity Pt/C catalyst at 90° C.

FIG. 4 presented herein shows a plot of the rate of hydrogen production for the reaction mixture and catalyst of this experiment. The plot shows results for a reaction temperature of 90° C. The plot indicates that $H_2$ gas is produced at a rate of 3.1 psi/hr. The results of this experiment indicate that the rate of hydrogen gas production at a given temperature is faster from ethanol than from methanol.

EXPERIMENT 8

In this experiment, ethanol, water, and a base (KOH) were mixed in a reaction flask in the presence of a catalyst. Specifically, 40 mL of ethanol and a solution containing 20 mL of water and 40 g of KOH were combined in the reaction flask in the presence of the high activity Pt/C catalyst as described in EXPERIMENT 4 hereinabove. The purpose of this experiment is to examine the effect of the amount of KOH on the reaction of ethanol. Except for the amount of KOH, the reaction mixture and catalyst of this experiment are the same as those used in EXPERIMENT 7 described hereinabove. In contrast to EXPERIMENT 7 described hereinabove, however, the addition of the KOH to the reaction mixture led to phase separation and the formation of a two-phase liquid mixture. Despite the presence of a two-phase mixture, reformation of ethanol and evolution of $H_2$ gas were observed in this experiment. In this experiment, the reaction occurred at the interface between the two liquid phases.

EXPERIMENT 9

In this experiment, formaldehyde, water, and a base (KOH) were mixed in a reaction flask in the presence of a catalyst. Specifically, 40 mL of formaldehyde and 20 mL of water were combined in the reaction flask. Since the reaction in this experiment was found to be highly exothermic, the reaction mixture was cooled in an ice bath and the KOH was slowly added to the reaction flask. The amount of ice used in the ice bath was controlled to control the temperature of the reaction flask. After mixing the KOH into the solution, the reaction flask was removed from the ice bath and allowed to return to room temperature. The high activity Pt/C catalyst described in EXPERIMENT 4 hereinabove was then introduced. Reaction of formaldehyde and evolution of $H_2$ gas were observed under the conditions of this experiment. The chemical determination and procedure for the quantification of the amount of $H_2$ gas produced by the reaction in the presence of the high activity Pt/C catalyst were completed as described in EXPERIMENT 3 hereinabove.

Figure 5:
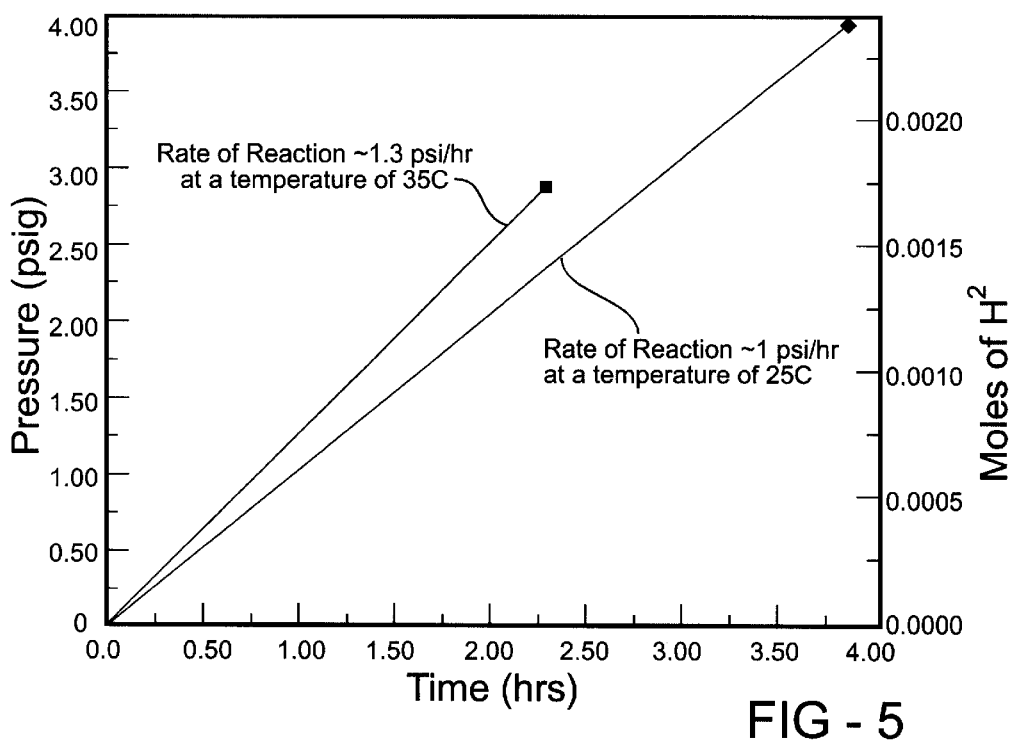
FIG. 5 is a plot of the pressure and moles of hydrogen gas produced as a function of time in the reaction of a mixture comprising 40 mL of formaldehyde, 20 mL of water, 40 g of KOH in the presence of a high activity Pt/C catalyst at 25° C. and 35° C.

Evolution of $H_2$ gas was visually observable in this experiment at room temperature from a reaction mixture in the liquid phase. FIG. 5 presented herein shows a plot of the rate of hydrogen gas production for the reaction mixture and catalyst of this experiment. The plot shows results for reaction temperatures of 25° C. and 35° C. The plot indicates that $H_2$ gas is produced at a rate of 1.0 psi/hr at 25° C. and 1.3 psi/hr at 35° C.

EXPERIMENT 10

In this experiment, methanol and a base (KOH) were mixed in a reaction flask in the presence of a catalyst. No water was added to the flask. Specifically, 60 mL of methanol were placed in the reaction flask and 22.5 g of KOH were subsequently dissolved therein at room temperature. The high activity Pt/C catalyst described in EXPERIMENT 4 hereinabove was next introduced into the reaction mixture and the mixture was then heated. Reaction of methanol and the production of hydrogen gas were observed in the liquid phase under the conditions of this experiment. A gas chromatograph was used to detect and measure the amount of hydrogen gas produced. Several temperatures were considered.

Figure 6:
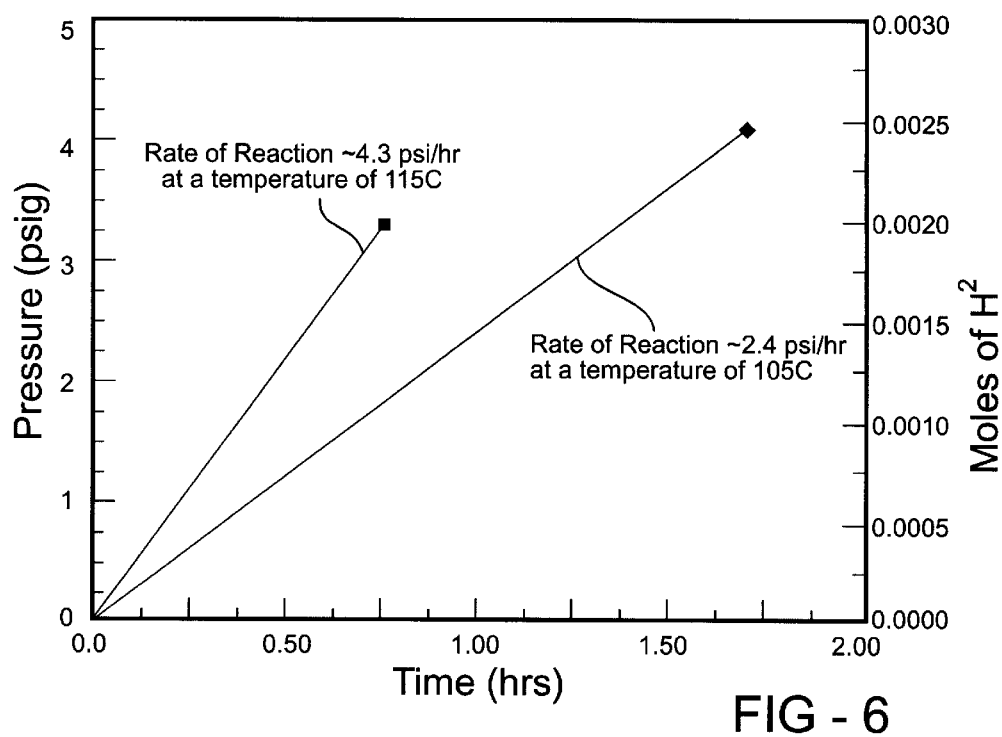
FIG. 6 is a plot of the pressure and moles of hydrogen gas produced as a function of time in the reaction of a mixture comprising 60 mL of methanol and 22.5 g of KOH in the presence of a high activity Pt/C catalyst at 105° C. and 115° C.

FIG. 6 presented herein shows a plot of the rate of hydrogen production for the reaction mixture and catalyst of this experiment. The plot shows results for reaction temperatures of 105° C. and 115° C. The plot indicates that $H_2$ gas is produced at a rate of 2.4 psi/hr at 105° C. and at a rate of 4.3 psi/hr at 115° C. This experiment demonstrates that direct addition of a base to an oxygenated hydrocarbon compound promotes the production of hydrogen in the absence of water.

The foregoing experiments demonstrate the concept of the present invention. The present invention provides a method for producing hydrogen gas from hydrocarbon and oxygenated hydrocarbon compounds. The advantages of the present invention include effecting hydrogen production at lower temperatures than heretofore possible and effecting hydrogen production without producing environmentally harmful by-product gases. In the preferred embodiment, the present invention further permits completion of hydrogen producing reactions in the liquid phase rather than the gas phase (e.g. steam conditions). Since hydrogen gas is the only gaseous product of the present invention, the need to separate hydrogen from other gases is eliminated thereby improving the cost efficiency of the hydrogen production process. The convenience of obtaining hydrogen from the present invention makes it suitable for providing hydrogen gas to fuel cells, hydrogen storage alloys and other hydrogen-based energy systems.

A critical feature of the present invention is inclusion of a base in a reaction mixture with a hydrocarbon or oxygenated hydrocarbon optionally including water. By including a base, the present inventors have shown that the hydrogen production process can be controlled by a reaction of a hydrocarbon or oxygenated hydrocarbon with the hydroxide ion instead of with water. As a result, the present inventors have shown that the bicarbonate ion and/or the carbonate ion in the aqueous phase are by-products instead of the greenhouse gases CO and/or $CO_2$ produced in the common prior art reformation processes. The present inventors have further shown that commonly available catalysts can enhance the rate of the hydrogen producing process of the present invention.

Although the experiments discussed hereinabove have described the application of the method of the present invention to methanol, ethanol and formaldehyde, it is readily evident to persons skilled in the art that the method is generally applicable to hydrocarbons, oxygenated hydrocarbons and related compounds. Compounds suitable for this invention include, but are not limited to, chemical compounds comprising carbon and hydrogen such as alkanes, alkenes, alkynes and substituted (for example, halogenated) forms thereof as well as chemical compounds comprising carbon, hydrogen, and oxygen such as alcohols, aldehydes, ketones, ethers, carboxylic acids and substituted (for example, halogenated) forms thereof.

The present invention can be practiced with liquid hydrocarbon or oxygenated hydrocarbon compounds that are miscible, immiscible or partially miscible with water. In the case of hydrocarbon or oxygenated hydrocarbon compounds that are miscible with water, the reaction of the present invention occurs in a homogeneous liquid phase. When a solid catalyst is present, the reaction occurs more readily at the interface between the homogeneous liquid phase and the solid catalyst. In the case of hydrocarbon or oxygenated hydrocarbon compounds that are immiscible with water, the reaction of the present invention occurs at the interface between the immiscible phases. As is well known in the art, the rate of reaction between immiscible phases can be increased by increasing the interfacial contact area between the immiscible phases. Dispersing techniques such as shaking, stirring, mixing or ultrasound are expected to increase the rate of reaction between immiscible hydrocarbon or oxygenated hydrocarbon and water phases. When a solid catalyst is present, the reaction occurs more readily at the point of contact of the solid catalyst with the interface between the immiscible phases. In the case of hydrocarbon or oxygenated hydrocarbon compounds that are partially miscible with water, the reaction of the present invention can occur at the interface between or within either of the different phases. When a solid catalyst is present, the reaction occurs more readily at the surface of the catalyst regardless of its location in the reaction mixture.

The present invention can also be practiced on gaseous or solid hydrocarbon or oxygenated hydrocarbon compounds. Gaseous hydrocarbon or oxygenated hydrocarbon compounds can be bubbled into a mixture containing a base in the liquid phase, such as an aqueous solution of a base, and reaction can occur at the gas-liquid interface, directly in the liquid phase if the gaseous compound is soluble, or at the surface of a solid catalyst if a solid catalyst is present. Solid hydrocarbon or oxygenated hydrocarbon compounds can be directly added to an aqueous solution containing a basic substance and optionally containing a solid catalyst. If the solid hydrocarbon or oxygenated hydrocarbon compound is soluble in water, reaction occurs in a homogenous liquid phase or at the surface of the solid catalyst. If the solid compound is insoluble in water, reaction occurs at the solid-liquid interface or solid-liquid-catalyst interface. If the solubility limit of a solid compound is exceeded, reaction occurs both in the bulk liquid phase and at the solid-liquid interface or at the surface of the solid catalyst.

A wide range of bases can be used in the context of the present invention to effect the production of hydrogen from hydrocarbon or oxygenated hydrocarbon compounds. Suitable bases include metal hydroxides (for example KOH, NaOH, etc.) and non-metal hydroxides (for example, ammonium hydroxide) that are capable of providing or producing hydroxide ions in a reaction mixture comprising a hydrocarbon or oxygenated hydrocarbon and optionally water. The range of suitable bases includes, but is not limited to, alkali metal hydroxides, alkaline earth hydroxides, transition metal hydroxides, post-transition metal hydroxides, lanthanide hydroxides, and organic hydroxides. The base is preferably soluble in the reaction mixture.

The present invention is preferably practiced in the presence of a catalyst. Suitable catalysts include, but are not limited to, activated carbon, metals, metal alloys, metal oxides, metal hydrides, transition metals, and supported versions thereof.

The scope of the present invention further provides for flexibility in the order of addition of ingredients. When water is present, for example, it can be combined with the hydrocarbon or oxygenated hydrocarbon compound before adding a base. Alternatively, water can be combined with the base before adding the hydrocarbon or oxygenated hydrocarbon compound. Similarly, the hydrocarbon or oxygenated hydrocarbon compound can be combined with the base before adding water.

The foregoing drawings, discussion and description are not meant to be limitations upon the practice of the present invention, but rather illustrations thereof. It is the following claims, including all equivalents, which define the scope of the invention.

We claim:

1. A process for producing hydrogen gas comprising the step of combining a hydrocarbon or oxygenated hydrocarbon with a base to form a mixture, said base reacting with said hydrocarbon or oxygenated hydrocarbon to form said hydrogen gas.

2. The process of claim 1, wherein said mixture further includes water.

3. The process of claim 1, wherein said reaction between said base and said hydrocarbon or oxygenated hydrocarbon occurs in the liquid phase.

4. The process of claim 1, wherein said hydrocarbon or oxygenated hydrocarbon is combined with said base in the presence of a catalyst.

5. The process of claim 1, wherein said hydrocarbon or oxygenated hydrocarbon compound is an alcohol.

6. The process of claim 5, wherein said alcohol is methanol.

7. The process of claim 5, wherein said alcohol is ethanol.

8. The process of claim 1, wherein said hydrocarbon or oxygenated hydrocarbon compound is an aldehyde.

9. The process of claim 1, wherein said base is in the form of an aqueous solution.

10. The process of claim 1, wherein said base comprises a hydroxide compound.

11. The process of claim 10, wherein said hydroxide compound is a metal hydroxide compound.

12. The process of claim 11, wherein said metal hydroxide compound is an alkali metal hydroxide compound.

13. The process of claim 12, wherein said alkali metal hydroxide compound is sodium hydroxide.

14. The process of claim 12, wherein said alkali metal hydroxide compound is potassium hydroxide.

15. The process of claim 3, wherein said hydrocarbon or oxygenated hydrocarbon is an alcohol.

16. The process of claim 15, wherein said alcohol is methanol, ethanol or propanol.

17. The process of claim 4, wherein said catalyst comprises a metal, metal alloy, metal hydride alloy, or metal oxide.

18. The process of claim 4, wherein said catalyst comprises a transition metal or a noble metal.

19. The process of claim 1, wherein said base provides hydroxide ions, said hydroxide ions reacting with said hydrocarbon or oxygenated hydrocarbon to form said hydrogen gas.

20. The process of claim 1, wherein said reaction between said base and said hydrocarbon or oxygenated hydrocarbon further forms carbonate ion or bicarbonate ion.

21. The process of claim 1, wherein said hydrogen gas is substantially the only gas phase substance formed by said reaction between said base and said hydrocarbon or oxygenated hydrocarbon.

22. The process of claim 1, wherein the temperature at which said reaction occurs is less than or equal to 120° C.

23. The process of claim 1, wherein the temperature at which said reaction occurs is less than or equal to 105° C.

24. The process of claim 1, wherein the temperature at which said reaction occurs is above about 65° C.

25. The process of claim 1, wherein the temperature at which said reaction occur is above about 35° C.

26. The process of claim 1, wherein the pH of said mixture is at least 6.4.

27. The process of claim 1, wherein the pH of said mixture is at least 10.3.

* * * * *